INVENTOR.
Joseph W. Smith.
BY
ATTORNEYS

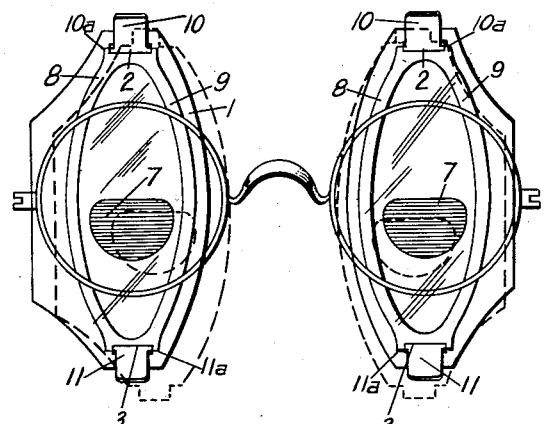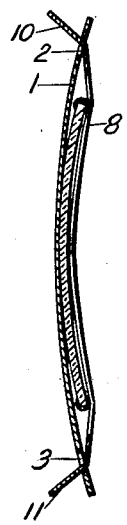
Fig. 7  Fig. 8
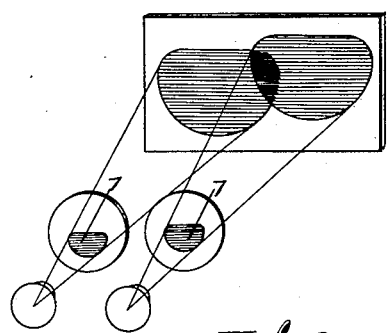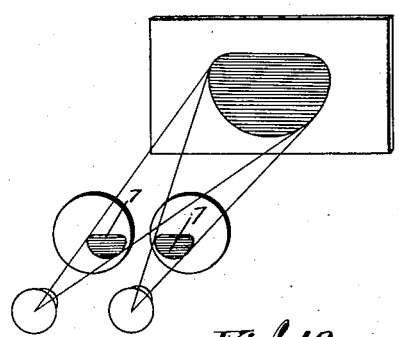
Fig. 9  Fig. 10

Fig. 11  Fig. 12  Fig. 13  Fig. 14  Fig. 15
INVENTOR.
Joseph W. Smith.
BY
ATTORNEYS Patented Nov. 20, 1934

1,981,439

UNITED STATES PATENT OFFICE 1,981,439

APPARATUS FOR DETERMINING THE PROPER RELATION BETWEEN THE VISION FIELDS OF MULTIFOCAL OPHTHALMIC LENSES

Joseph W. Smith, Cambridge, Ohio

Application January 4, 1933, Serial No. 650,122

1 Claim. (Cl. 88—20)

My invention relates to apparatus for determining the proper relation between the vision fields of multifocal ophthalmic lenses. It has to do particularly with bifocal lenses, though it is not necessarily limited thereto.

In the prior art, those persons who have had the task of prescribing and fitting bifocal glasses for a patient have been much handicapped because of inadequate methods and apparatus for determining the proper location, size and shape of the reading segment with relation to the distance vision portion of the lens. The usual methods of locating the reading segments, as to the space between them, have consisted in instructing the patient to observe a proximate object while the fitter estimates, with a rule, the distance between the pupils and the desired pupillary distance for near vision work. Various rules are followed in the location of the upper edge of the reading segment but these are more or less arbitrary and the final determination of this location by such methods results in only roughly approximating the true position.

Efforts have been made in the past to provide trial devices for predetermining the location of the near vision portions of ophthalmic lenses. In some cases, trial frames have been used for this purpose but most of these trial frames have been of such weight that they do not accurately determine the desired position of the upper edge of the segment. Furthermore, such prior art devices as have been suggested have utilized trial reading segments of focal power and have relied upon this focal power to apprise the patient of the proposed positions of the segments in the lenses to be ultimately produced. New shapes and sizes of segments are constantly appearing upon the commercial market and the production of a series of segments of different focal power for each new shape and size of segment presents a condition which has hitherto been a large contributing factor in the failure of such devices to find favor in the market. Furthermore, the placing of a reading segment of focal power in juxtaposition with a distance vision lens frequently creates a blurred condition at the line of demarcation between the two types of lenses, so that the patient is confused in his effort to determine the exact location of this line of demarcation. Besides this, it is impossible to distinguish or even to have a proper conception of the extent of a reading field where the only differentiation is caused by the change in the focal value. In addition to this, glass trial segments cannot readily be placed in conforming contact with the other lenses both on account of the large number of curves encountered and because of danger of scratching the lenses.

The selection of the size and shape of the reading segment has been more or less haphazard. Little consideration has been given to the question of the relative utility of different sizes and shapes of segments in the fitting of any particular patient.

One of the objects of this invention is to provide a method and apparatus whereby the proper location of the reading segment may be determined simply and with accuracy.

Another object of this invention is to provide a method and apparatus whereby the proper size of the reading segment may be determined with greater certainty.

Another object of this invention is to provide such a method and apparatus as will facilitate the selection of a reading segment of a shape which will be most suitable to the wearer of the lenses, either for general purpose wear or in the pursuit of special activities.

Still another object of this invention is to provide a method and apparatus whereby it may be determined at the initial examination of the patient whether or not the selected location of the reading segment will result in a fusion of the two fields of vision into one field when both eyes are used for reading or viewing proximate objects.

In its preferred form, my invention contemplates the provision of trial reading segment members without focal characteristics. Each reading segment member comprises a colored area of the size and shape of the actual segment being considered for ultimate use in the multifocal lens. Moreover, the color of this area is sufficiently pronounced to ensure that the patient looking through such colored area at an object of near vision will observe a colored field of vision which is distinctly differentiated from that field of vision discernible when the line of vision is directed outside of the colored area.

The reading segment member preferably takes the form of a celluloid strip and is associated with a means for mounting it adjustably in covering relation to an ophthalmic lens or to the eye wires of a spectacle. This celluloid strip is sufficiently flexible and the apparatus upon which it is mounted is of such a nature that the strip may be caused to hug a lens when mounted thereon. It is intended that a series of pairs of these celluloid strips shall be provided, with the units of each pair having colored areas of duplicate size and shape. The celluloid strips are preferably clearly transparent in the areas surrounding the colored areas and are provided with suitable calibrations to assist the fitter in making a record of the proper position for the segment when this position has been once determined by the use of the trial device. The celluloid strips are readily detachable and replaceable with other strips.

Both units of a pair may be placed upon the spectacle for determining the proper spacing of the reading segments, this being indicated to the patient when the colored area revealed to him is substantially uniform throughout. At the same time, the patient will be enabled to determine whether or not the size and shape of the proposed segments will be adequate to give him that range of vision best suited to the conditions which he will expect to meet. However, the units of a pair may be used independently in the trial operation to determine whether or not it will be necessary to have prism correction in the segment and whether this prism should be base-in or base-out, as will be more fully explained hereinafter.

Furthermore, in using my method, the positioning in front of the eyes of the colored areas corresponding in size and shape to the actual reading segments proposed for adoption will enable the wearer to determine with comparative certainty whether or not the upper edges of the reading segments are at the proper height on the proposed lenses and whether or not these reading segments are adequate in size and shape for actual conditions of use. In other words, the patient may observe a printed page or other near vision objects through the colored portions of segment members and determine whether or not the size and shape of the segment is such as to give him an adequate near vision under any conditions of use substantially duplicating the conditions which must be met by the near vision segments of the actual lenses. Likewise, the patient may test his distance vision in relation to his near vision by directing his vision through the areas outside of the colored area and determining whether or not the location, size or shape of the reading segment portion as represented by the colored area will offer interference to his view of distant objects in any of his normal postures and even when moving.

This application is a continuation in part of my application filed July 16, 1931, Serial No. 551,104.

The apparatus by which this method is performed may vary to a considerable extent. However, the apparatus which I prefer is shown in the accompanying drawings wherein similar characters of reference designate corresponding parts and wherein:

Figure 7 is a front elevation of a pair of spectacles with one of my devices applied to each lens member.

Figure 8 is a sectional view illustrating one of my devices applied to a lens.

Figure 9 is a diagrammatic illustration of the lack of fusion of the images which will result from an improper positioning of the segments in front of the eyes.

Figure 10 is a view similar to Figure 9 and illustrating the manner in which the proper adjustment of the segments brings about a fusion of the two images into one.

Figures 11 to 15 are diagrammatic illustrations of several shapes of reading segments which are in vogue at the present time.

Figure 1:
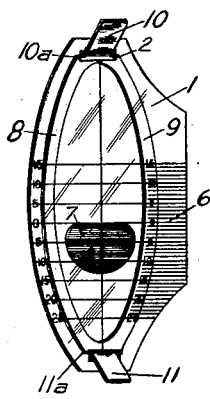
Figure 1 is a perspective view of my apparatus, with the reading segment member supported upon its framework.

In the drawings, my reading segment member is designated 1. As shown, it is of substantially elliptical form and is provided at the ends thereof with slots 2 and 3. It is preferably provided, along each edge thereof, with a series of calibrations. These calibrations may be millimeters extending above and below a zero line 6 coincident with the top of a segment representation.

This segment member 1 is preferably formed of celluloid and is ordinarily transparent for the greater portion of its area. It is also readily flexible so that it may be caused to conform to the convex surface of a lens by the application thereto of comparatively slight pressure. It is desirable that this segment be neither too stiff nor too flexible and I have found that celluloid of about .015" thickness is quite suitable.

This segment member 1 is further provided with a colored transparent portion 7 which may vary as to size and shape. In the form shown in Figures 1 to 10, it comprises slightly more than the lower half of a circle with its upper edge substantially flat and with its upper corners rounded. It is contemplated that a series of pairs of these segment members 1 will be provided with the color transparent portions thereof corresponding in size and shape to the reading segments of currently marketed lenses, though special sizes and shapes may be used if desired. It is to be understood that the function of this segment member is essentially that of a carrying device for supporting a segment shaped member and that other means such as small arms projecting inwardly on an embracing member could support the segment member.

The framework upon which each segment member is adapted to be mounted is also of substantially elliptical form and is open for the greater portion of its area. Thus, it comprises legs 8 and 9 of slight width. Also, at its ends, it is provided with laterally extending lugs 10 and 11 which are integrally formed with the body portion of the framework and which might be said to be the short arms of bell crank levers whose long arms form a part of the main body portion and whose shifting fulcrums lie at about the points of juncture of the lugs with said body portion.

Figure 3:
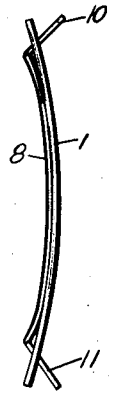
Figure 3 is a side elevation of the structure shown in Figure 1 in its normal position when not in use.

This framework is preferably made of metal by a stamping process and is inherently flexible. Moreover, in its normal position, as illustrated in Figure 3, it is bent or bowed inwardly so that its center lies between the laterally extending lugs and a substantial distance back of a straight line between the juncture points of such lugs with the body portion. It is sufficiently resilient that it will tend to return to this position and it is normally effective to maintain the segment member inwardly bowed in a similar manner.

Figure 2:
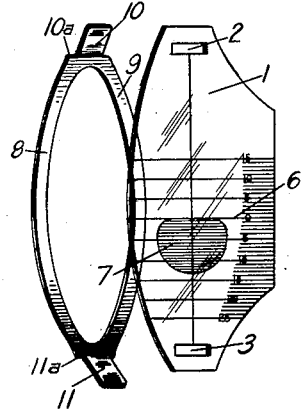
Figure 2 is a perspective view of the apparatus shown in Figure 1 with the reading segment member removed from its framework.

It will be obvious from the showing of Figures 1, 2 and 3 that the lugs 10 and 11 of the framework are adapted to extend through the slots 2 and 3 of the segment member. It will also be apparent that the segment member is readily removable from the framework and that any segment member of the provided series may be substituted therefor with minimum difficulty.

The lugs 10 and 11 of the framework are preferably provided, respectively, with shoulders 10a and 11a which limit their passage through the slots in the segment member. These shoulders perform, at least, two functions. They serve to force a substantial area of the center of the segment member inwardly against the framework which, when the device is placed upon a lens, serves to maintain a substantial area of the segment member in frictional contact with the face of the lens. Also, they space the body portion of the framework a slight distance from the segment member at the ends of such body portion, so that this body portion and the segment member will have a more nearly parallel gripping action upon the spectacle eye wires, which is particularly advantageous where these eye wires are quite thick as in shell-rim spectacles.

Figure 4:
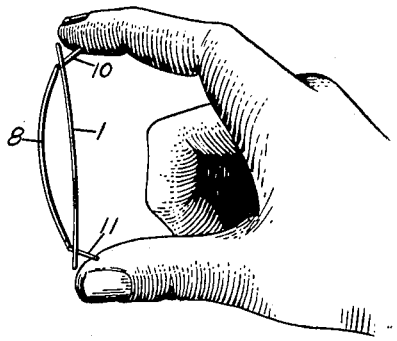
Figure 4 is a side elevation of the apparatus, illustrating the manner in which the reading segment member and its framework may be spread apart by pressure applied to the framework.

The application of my device to a spectacle frame is illustrated clearly in Figures 4 to 8, inclusive. Thus, as shown in Figure 4, pressure exerted upon the extremities of the lugs 10 and 11 will cause the framework to bow outwardly away from its normal position and away from contact with the segment member. This separation may be adequate to permit the device to be slipped over the temple wires of the spectacle frame and thence into embracing relation to the eye wires of the frame or to the lens if the spectacle is rimless.

Figure 5:
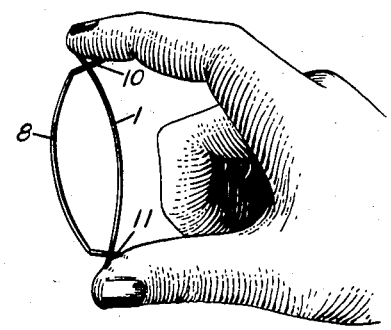
Figure 5 is a view similar to Figure 4 but illustrating the manner in which the reading segment member and its framework may be further spread apart by the application of pressure to both the framework and to the reading segment member.
Figure 6:
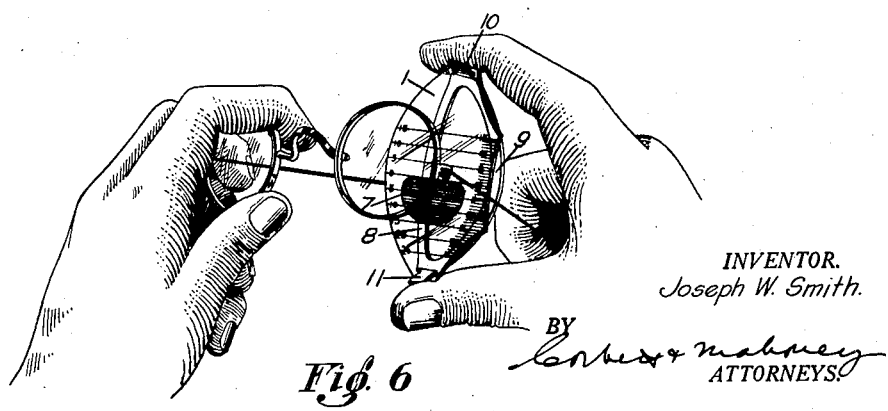
Figure 6 is a perspective view illustrating the manner in which my device may be applied to a pair of spectacles.

If the separation effected by the operation shown in Figure 4 is not adequate to permit the ready placement of the device upon the spectacle frame, the operation of Figure 5 may be performed. In this operation, the finger and thumb exert simultaneous pressure upon the lugs 10 and 11 and the ends of the segment member 1. This causes a positive bowing of the framework outwardly and a positive bowing of the segment member inwardly and further increases the space between the framework and the segment member, as indicated by comparison of Figure 5 with Figure 4.

The most effective method of using these devices for determining the ultimate position of the reading segment in each lens is by the mounting of one device on each lens or each eye wire of a spectacle frame, as illustrated in Figure 7. A special trial spectacle frame may be used or, if the patient is a wearer of spectacles, the devices may be slipped upon the spectacle frame which he customarily wears. In first positioning this device upon the spectacle, it will probably be desirable to so position it that the zero line is slightly below the points of juncture of the temple wires and the bridge with the eye wires, so that the colored portion will be the approximately proper position.

When the devices have been thus positioned, they will be frictionally held in such position by the resilient action of the framework. Furthermore, as illustrated in Figure 8, the segment member 1 will hug the outer surface of the lens for the greater portion of its area. It will be noted that the framework is of sufficient length to permit substantial vertical adjustment of each device. As a matter of fact, each device may be adjusted either vertically or laterally or may even be given a rotative adjustment.

The patient may then be given a printed page to observe and may be told to look through the colored portions of the segment members and to state whether or not this colored portion is properly located and of adequate size and proper shape to permit him to have a complete range of reading vision through such colored portion in all normal positions at which he will expect to ultimately use the reading segments of his glasses. Since the printed page will appear colored when he sees it through the colored portion of the segment member and will be uncolored when his vision passes beyond the area of this colored portion, he can state with certainty whether or not his range of reading vision is adequate for all normal near vision conditions which he expects to encounter.

The attention of the patient may also be called to the question of uniformity of the colored area on the printed page. If this colored area is not of uniform density throughout, this will indicate that the colored portions of the segment members are either spaced too far apart or are too close together to effect a complete fusion of the images viewed independently by each of the patient's eyes. The devices may then be adjusted, as illustrated in Figures 9 and 10, until these images fuse and this will be readily recognized by the patient since it will cause the colored portions upon the page to be of uniform density throughout.

The patient may then be instructed to view objects at a distance through the reading areas of the lenses. This may be effected both while the patient is seated and while he is standing, or he may be instructed to move around and state whether or not the colored portions of the segment members interfere with his view through the distance field.

When the patient finds that the colored portions of the segment members are so satisfactorily placed as to appear perfectly blended into one binocular image the distance between the vertical center lines of the segment members is measured and this will determine the proper distance apart, center to center, of the segments in the finished lenses. Also, the cross lines on the wafers and the associated calibrations will determine the proper height at which the segments should be placed in the finished lenses.

While this device permits of the determination of the exact distances, from center to center, that the segments should be spaced apart in the actual lenses, it should be understood that, in certain cases, it may not be desirable to have the exact physical centers of the segments so placed. In certain cases, it may be determined by the use of my device whether or not prism correction is needed in one or more of the lens segments. Thus, by mounting one of my devices with a green color portion upon one of the lenses of the spectacle frame and without using another device on the other lens and by observing a vertical red line with both eyes, need of prism correction will be indicated by the fact that the patient sees one black line and one red line spaced therefrom or otherwise displaced. This will indicate that prism correction is needed and whether it should be base-in or base-out. The amount of such prism correction may be then determined by the trial of lenses or segments having focal power.

Similar results may be obtained by placing one of these devices in covering relation to each eye, with the transparent colored members thereof being identical in size and shape and having the interpupillary distance the same as that in which it is proposed to mount the ultimate segments of the lenses to be worn and ascertaining whether or not the colored fields seen on a screen by each eye are exactly superimposed when both eyes are used simultaneously. If they are not exactly superimposed, this will indicate that there is need of prism correction. The amount of such prism correction may then be determined by the use of prism lenses.

The method and apparatus which I utilize may vary considerably without departing from the principles of my invention. Thus, as disclosed in my co-pending application, Serial No. 551,104, I may use a segment member formed of a transparent colored material in conjunction with a chart having a series of lines thereon which are of a different color from the color of the segment member. Preferably, the lines of the chart are red and the segment member is of such a shade of green that the patient looking through the green segment member at the red lines of the chart will see these lines as black lines. This is referred to in the said application as color suppression. Its main purpose is to differentiate the field of near vision from the field of distance vision, so that if the patient looks through the segment, he will see black lines while, if he looks through the area above or at the sides of the segment, he will see red lines. Thus, he is enabled to determine whether or not the segment is properly positioned as to height and also as to lateral position. Also, it will be apparent that a pair of segment members of the type described in the said application may be utilized, at least to some extent, for determining that position of the segment which will, in the ultimate lenses, result in a proper fusion of the fields of vision of the two eyes into a single field of vision.

It will also be understood that the transparent color portions of my segment members may take the form of lens power segments. However, these lens power segments should be of such a color as to clearly and sharply distinguish the near vision field from the distance vision field, as previously described.

If desired, I may use a segment member wherein the area corresponding to the segment is opaque, while the surrounding area is transparent. Likewise, I may use a segment member wherein the area corresponding to the segment is transparent, while the surrounding area is opaque. There are other ways in which the patient may be apprised of the extent and location of the area of the reading vision segment which is to be adopted.

It is to be understood that I am not confined to the use of a single color in this device, in fact I have found that with the use of two complementary colors such as red and green, one over each eye, very satisfactory results are obtained. In this case one eye sees a red field, the other green, but when both fields are exactly superimposed the whole field appears black or nearly so.

It will likewise be apparent that other types of apparatus may be utilized by me for the performance of my method. For example, the type of apparatus shown in the said co-pending application with the adjustable parts there shown may be utilized.

It will be seen from this that I have provided a novel method and apparatus whereby the proper location, size and shape of the reading segment may be determined with great facility and ease prior to the actual production of the multifocal lens to be worn by the patient. It will also be apparent that my method and apparatus have numerous important advantages in prescribing and fitting ophthalmic lenses.

One advantage consists in the fact that the patient can be made to realize before he actually orders bifocal lenses that the reading segment which is to be supplied would give him an ample range of vision for all near vision purposes and that this reading segment will constitute no material obstruction to his view of distant objects through the distance vision portion.

Another advantage consists in the fact that the patient will be enabled to try different sizes and shapes of reading segments and to ascertain with reasonable certainty the particular shape and size of reading segments best suited to the near vision conditions which he expects to encounter.

Still another advantage resides in the fact that the proper position of the reading segment in the lens blank may be predetermined, both from the standpoint of the proper location of the upper edge of the reading segment and of all other edges thereof which are to lie within the finished lens area.

A further advantage of this invention arises from the fact that the reading segment members on a pair of lenses will show to the wearer whether or not the images conveyed to both eyes are fused into a single image in any selected position of the reading segment. Thus, if this selected location of the reading segments does not bring about complete fusion of the image, the segment members may be adjusted upon the spectacle frame to correct this condition and when it is once corrected, segments so located in the finished lens will normally insure complete fusion of the image of a near object when viewed through the near vision portion.

Another advantage of this invention arises from the fact that it may be utilized to determine whether or not the reading segment of the ultimate lenses should be given additional prism corrections in order to bring about complete fusion of the image. Thus, it may be found that the patient locates the segments at abnormal positions in an attempt to secure uniformity of the color. In such a case, it will be indicated that further prism corrections, as for example, base-in prism segments, must be prescribed to bring about required fusion of the image.

A still further advantage of my invention arises from the fact that the reading segment members are removable from the frameworks which support them with a minimum of difficulty. This renders possible the ready substitution of other segment members wherein the reading segment areas differ in size and shape from that replaced. It also makes possible the substitution of segment members having translucent portions corresponding in size and shape to segment members of new size and shape as they develop in the art.

Another advantage of my invention consists in the extreme simplicity of the parts and the obviously low cost of manufacture of devices made in accordance with my invention.

Another advantage of my invention arises from the fact that the segment members are readily flexible so that they hug the surfaces of the lenses and position the colored transparent portion in contact with these lenses. Furthermore, since they are preferably of celluloid or like material rather than glass, there is no danger of scratching the lenses.

A still further advantage of my invention consists in the fact that the devices which I utilize for performing my method are capable of universal adjustment upon the lenses or eye wires of a spectacle frame. Moreover, such adjustment may be made without any difficulty whatever, since the devices are held in each position of adjustment merely by frictional contact.

A still further advantage of my devices arises from the simple manner in which they may be slipped upon a spectacle frame, merely by spreading the parts thereof by the use of two fingers of one hand.

Numerous other advantages will be obvious and need not be amplified here.

In the specification and in the claim following, by the terms "near vision portion" and "distance portion" or similar terms which I use in describing my device, I mean the transparent colored portion, corresponding in shape to the reading segment member of the ultimate lens, and the transparent area surrounding said colored portion respectively.

Having thus described my invention, what I claim is:

A device for testing the eye to determine the proper location of a segment of a multifocal ophthalmic lens comprising a flexible piece of material to be disposed in covering relation to the eye, said piece of material having a transparent clear portion and a transparent colored portion, with one of such portions being of a size and shape corresponding to the segment proposed for the lens, and means for supporting said piece of material upon a lens of a pair of spectacles and causing it to lie in contact with a curved surface of such lens for a substantial area.

JOSEPH W. SMITH.